(No Model.) 2 Sheets—Sheet 1.

H. GOODWIN.
MACHINE FOR MAKING COMPRESSIBLE TUBES.

No. 574,147. Patented Dec. 29, 1896.

Witnesses
Robert Sollberger
James Wayland

Inventor:
Hannibal Goodwin,
By Drake & Co., Atty's.

THE NORRIS PETERS CO., PHOTO-LITHO., WASHINGTON, D. C.

(No Model.) 2 Sheets—Sheet 2.

H. GOODWIN.
MACHINE FOR MAKING COMPRESSIBLE TUBES.

No. 574,147. Patented Dec. 29, 1896.

Witnesses
Robert Solberger
James Wayland

Inventor
Hannibal Goodwin,
By Drake & Co. Atty's.

UNITED STATES PATENT OFFICE.

HANNIBAL GOODWIN, OF NEWARK, NEW JERSEY.

MACHINE FOR MAKING COMPRESSIBLE TUBES.

SPECIFICATION forming part of Letters Patent No. 574,147, dated December 29, 1896.

Application filed November 7, 1893. Serial No. 490,233. (No model.)

*To all whom it may concern:*

Be it known that I, HANNIBAL GOODWIN, a citizen of the United States, residing at Newark, in the county of Essex and State of New Jersey, have invented certain new and useful Improvements in Machines for Making Compressible Tubes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to enable compressible tubes, particularly such as are of translucent, pliable, celluloidal matter and are employed in containing or holding pigments, vaseline, &c., to be made with greater perfection and accuracy, to reduce the cost of constructing said tubes, and to render the same more substantial and strong to resist the ordinary wear and tear of service, and to obtain other advantages and results, some of which will be referred to hereinafter.

The invention consists in the machine or apparatus for use in manufacturing tubes from flexible and compressible pellicles or films, such as those of celluloidal compositions, gelatin, &c., and in the arrangements and combinations of parts, all substantially as will be hereinafter set forth, and finally be embraced in the clauses of the claim.

Figure 3:
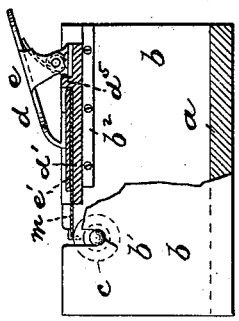
Figure 4:
Figure 1:
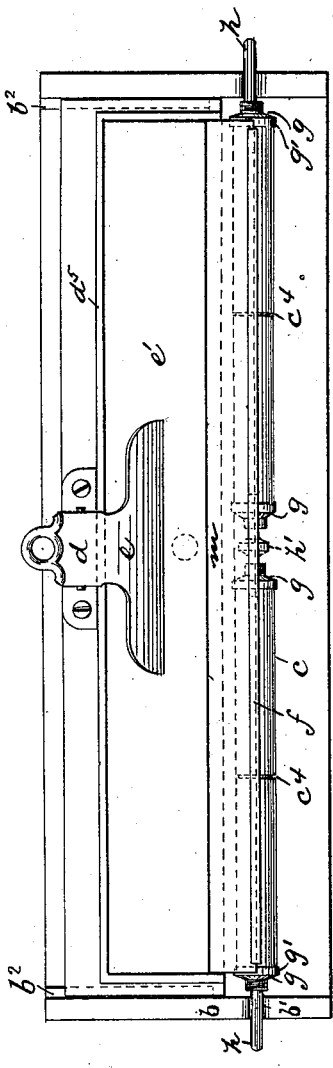
Figure 2:
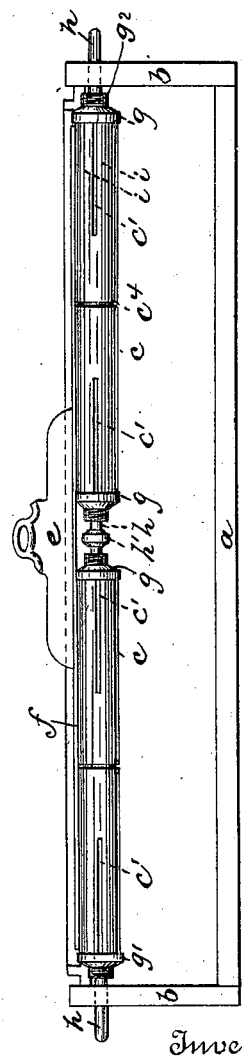
Figure 5:
Figure 6:
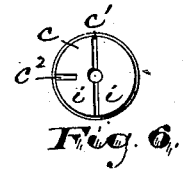
Figure 7:
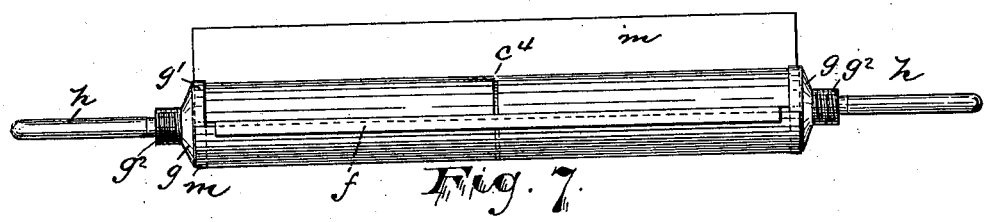
Figure 8:
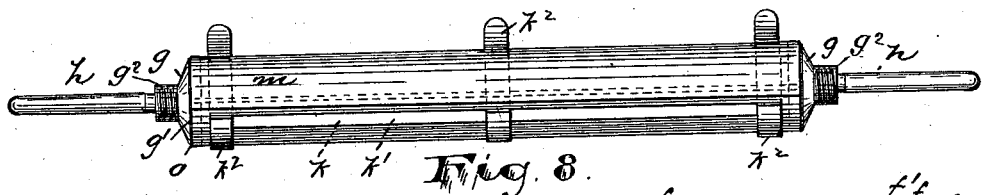
Figure 9:
Figure 10:
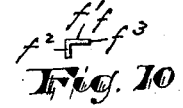
Figure 11:
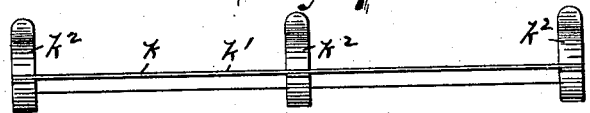
Figure 12:
Figure 13:
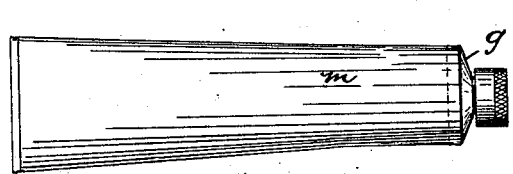
Figure 14:
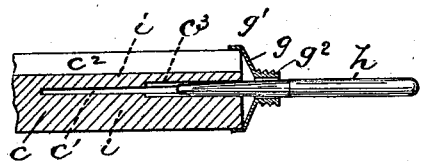
Figure 15:

Referring to the accompanying drawings, in which like letters indicate corresponding parts in each of the several views, Figure 1 is a plan of my tube-forming machine. Fig. 2 is a front elevation of the same, and Fig. 3 is an end view and partial section. Fig. 4 is a detail showing in elevation a double clamping-strip for holding the edge of the pellicle to the cylindrical former. Fig. 5 is a detail of a forming-cylinder, having a tube end piece and a wedge at one end. Fig. 6 is an end view of said cylinder. Fig. 7 is a view of said cylinder, showing two end pieces wedged in place and a pellicle clamped thereon. Fig. 8 shows the same when the clamp above referred to is removed and another clamp is applied. Figs. 9 and 10 are respectively a plan and end view of the clamp shown on the cylinder in Fig. 7 and which is a single variety of that shown double in Fig. 4. Figs. 11 and 12 are respectively a plan and end view of the clamp shown on the cylinder in Fig. 8. Fig. 13 is a view of the completed tube, and Fig. 14 is a view of the cylinder in section and showing the relation of the wedges thereto more clearly. Fig. 15 illustrates the method of cementing the pellicle forming the body of the tube to the end piece.

In said drawings, $a$ indicates a suitable bed having bearings or supporting-standards $b$ of any desirable construction for the forming-cylinders $c$, the said standards being preferably recessed or notched, as at $b'$, to receive and allow the removal of said cylinders with ease and speed and allow a quick operation in the process of making the tubes. At the upper part of said standards, adjacent to said recesses $b'$, are slideways $b^2$, which provide bearings for a sliding pellicle-clamp $d$, consisting of a bottom board $d'$ and a hinged and spring-actuated clamp-section $e$, having the plate $e'$, adapted to press against the upper side of the pellicle and hold the same flat and in a plane coinciding with the periphery of the tube-forming cylinder, as in Fig. 3. The said tube-forming cylinder $c$ consists of a piece of wood or other material suitable for the purpose of about the diameter of the desired tube, the ends of which may be split, as by a saw cut, as shown at $c'$ in Fig. 6, and one side of which is longitudinally grooved, as at $c^2$, to receive and hold a gaging and pellicle-clamping strip $f$, Figs. 1, 7, and 9. The split ends are of a size nearly corresponding with the interior recesses of the tube end pieces $g$, so as to fit into said recesses, as indicated in Fig. 14. The said ends are preferably bored out at the centers, and into the borings $c^3$ wedge-like pins $h$ may be, and preferably are, forced, so as to spread the members $i\ i$ apart, so that they will press hard against the interior walls of the flanges $g'$, Fig. 14, and hold the tube end pieces securely to the cylinder. This spreading action serves also to smooth out the end-piece flange, which, being usually of soft and very thin metal, is easily bent, and in the market is found of irregular shape, so that the pellicle forming the body of the tube cannot be smoothly and perfectly cemented thereto. By spreading the split ends of the tube-forming cylinder against the interior of the tube end pieces the latter are not only held in place, but are brought into condition to receive the pellicle.

The projecting portions of the pins $h$, which extend through the threaded nozzles $g^2$ of the tube end pieces, may serve as spindles or pivots on which the cylinders turn, and in the double construction shown in Figs. 1 and 2 they may be oppositely tapering and serve in spreading the contiguous ends of adjacent cylinders and in coupling said ends together. In the latter event they are provided with shoulders $h'$, which limit the movement of the cylinders on said coupling-wedges beyond the centers of said wedges, as will be understood.

The clamp $f$, which is used in one of the earlier steps in the method, is provided with a longitudinal flange $f'$, adapted to rest upon the periphery of the cylinder or to press the edge of the pellicle thereto and hold the same in place thereon. It also serves as a gage or guide for a second pellicle-clamp $k$, adapted to hold the pellicle after the first clamp is removed, as will be hereinafter described.

Where the cylinders are arranged in pairs or in series, as illustrated in Figs. 1 and 2, the clamp $f$ is constructed as shown in Fig. 4, the portion $f^2$, which enters the longitudinal slot $c^2$, being removed, as shown at $f^3$, to provide for the tube end pieces upon the ends of the cylinders. The clamps $k$ for holding the pellicles upon the cylinders after the clamps $f$ have been removed and while the edges of the said pellicle are being united consist of a strip $k'$ and a series or plurality of curved spring-arms $k^2$. The position of the longitudinal strip on the cylinder is gaged and determined by the clamping-strip $f$ and the arms $k^2$ inclose and hold the pellicle wrapped around the cylinder in position for cementing.

The centers of the cylinders are provided with annular grooves $c^4$, which serve in guiding a cutting-blade in dividing the cylinder, as hereinafter described.

In carrying out the invention and effecting the process or method, I first form a pellicle or film by drying a fluid composition of a gelatinous or celluloidal nature upon a smooth surface, such as that of glass, and dry the same, so that a smooth, transparent, flat, and flexible pellicle or film is formed. Said pellicle is then cut into rectangular pieces of uniform size, suited for the tubes desired, and are placed one at a time in the sliding clamp $d$, with one of the longer edges projecting beyond the bottom plate $d'$, as shown in Fig. 3, $m$ indicating said pellicle. The said clamp $d$ is so formed as to bring the projecting edge of the pellicle into a line parallel with the axis of the cylinder $c$, the rib $d^5$ serving as a gage to receive the inner edge of the rectangle and produce the desired parallelism. I next insert the clamp $f$ in the groove of the cylinder, with its clamping-flange $f'$ raised from the peripheral surface and extending toward the sliding clamp. Said sliding clamp is then moved forward or toward said clamp $f$, and the projecting pellicle is entered beneath the flange $f'$ and stopped by part $f^2$, projecting from the slot. The clamp $f$ is then pressed down and the pellicle is caught upon the cylinder. The clamp $d$ is then opened and removed from the pellicle and the latter is turned around the cylinder and caught by the clamp $k$, the strip $k'$ of which is brought against the edge $f^3$, Fig. 10, in clamping, and is thus parallel with the longer edges of the rectangle. The clamp $f$ is then removed, exposing the edge of the pellicle, and the free edge, lying opposite the one exposed, is cemented or glued to the first, a suitable cement, preferably one having the desired transparency, being employed. After joining the edges a knife may be passed around the cylinder, guided by the annular groove $c^4$, and the tube cut in two or four or more, as the case may be.

When the tubes are employed in connection with the end pieces $g$, the latter are clamped upon the opposite ends of the cylinder prior to turning the flexible pellicle, the flanges being made smooth in the clamping operation and being supplied with cement. The pellicle is then turned over the outside of the flanges $g'$, as indicated in Figs. 7 and 8, and fastened thereto at the same time that the longitudinal joint is being formed.

The celluloidal pellicle is wrapped around the mandrel and over the flanges of the end piece or pieces before it has reached a perfectly-cured state. In drying or curing, it gradually contracts and closely and firmly hugs the flange to which it is cemented, and thus a perfect connection is maintained.

By applying the pellicle to the outside of the flange, as indicated, when the pellicle contracts, as it does ordinarily as it grows older and drier, it will not tear away from the end piece, but, on the contrary, will hug said end piece more closely, so that the tube is rendered more durable than by covering the edge of the pellicle by the end piece and cementing the latter to the inner wall of the former.

In cementing the body portion of the tube to the outside of the end piece, the cement, which is of a nature closely allied to, if not the same as, the fluid from which the pellicle forming said body portion is derived, is applied to the end piece, so that it extends over the shoulder of said end piece, as shown in Fig. 15, thus, when dried in connection with the pellicle, forming a holding-flange $m'$, which prevents withdrawal of the end piece from the body. The end piece does not depend, therefore, on the mere adhesiveness of the cement for its security. The shoulder $m^2$, formed in the body material by its contraction in drying, is also indicated in Fig. 15. This shoulder also serves in preventing longitudinal displacement of parts, as will be evident.

With reference to the longitudinal groove $c^2$ in the cylinder $c$, I may add that said groove not only serves as a receiver for the clamp $f$, but also in cementing the longitudinal edges of the body $m$ to prevent the flow of cement onto said cylinder, by which the body and cylinder will become united and interfere with speedy work. It is understood that on the removal of the clamp $f$ the exposed edge of the pellicle extends close up to the groove, and in brushing the cement upon said exposed edge none is brushed upon the cylinder because of said groove.

Having thus described the invention, what I claim as new is—

1. The improved machine for forming compressible tubes, in which is combined with means for holding the pellicle upon the cylinder while being cemented and joined, a forming-cylinder having split ends to receive the end pieces and wedges for spreading the same substantially as set forth.

2. The machine for forming compressible tubes, in which are combined clamps or holders for clamping or holding the cylindrical pellicle upon the cylinder while the joints are drying, with the forming-cylinder having the peripheral knife-guiding groove, $c^4$, substantially as set forth.

3. In a machine for forming compressible tubes, the forming-cylinder having the opposite ends split and centrally bored, in combination with spindle-like wedges for spreading said ends, clamps for holding the longitudinal edges of the pellicle together and pellicle-holders arranged contiguous to said forming-cylinder, substantially as set forth.

4. In a machine for forming compressible tubes, the combination with a longitudinally-grooved cylinder, of a removable pellicle-clamp held within the groove and having a flange, $f'$, to clamp the edge of the pellicle longitudinally upon the periphery of the cylinder substantially as set forth.

5. In a machine for forming compressible tubes, the cylinder, $c$, having the opposite ends split and centrally bored and having the longitudinal groove at the periphery and the central knife-guiding groove, in combination with wedges $h$, and a clamp, $f$, substantially as set forth.

6. In combination, in a machine for forming tubes, the cylinder $c$, clamps $f$ and $k$, and a sliding clamp adapted to hold the edge of the flat pellicle to the periphery of the cylinder, substantially as and for the purposes set forth.

7. The combination with the bed, $a$, having standards $b, b$, of cylinder, $c$, and a clamp adapted to hold the overlapping or cemented edges of the pellicle together onto the cylinder during the cementing and drying operation, and means for supporting the cylinder in the standards, substantially as set forth.

8. The combination with the bed $a$, standards $b$, cylinders $c$, and wedges $h$, of clamps for holding the pellicle in place upon said cylinders during the cementing operation, substantially as set forth.

9. The combination with the standards, $b$, having recesses $b'$, a plurality of cylinders $c, c$, having spindles, $h$, arranged in said recesses, the contiguous ends of said cylinders being connected by a spindle, $h$, substantially as set forth.

10. In combination the standards $b$, cylinders $c, c$, split and grooved, longitudinally and peripherally, of wedges, $h$, one of which tapers oppositely and is provided with a central shoulder, $h'$, substantially as set forth.

11. In combination with the cylinder adapted to receive the end pieces, $g$, at its ends, a longitudinal clamp, $f$, a clamp, $d$, adapted to hold the pellicle flat and admit of moving said pellicle toward said clamp, $f$, and a clamp $k$, adapted to hold the pellicle to the cylinder after the removal of the clamp, $f$, substantially as set forth.

12. In combination with the cylinder having a longitudinal clamp removable from said cylinder, a clamp $k$, having the strip $k'$ and curved spring-arms, $k^2$, substantially as set forth.

In testimony that I claim the foregoing I have hereunto set my hand this 2d day of November, 1893.

HANNIBAL GOODWIN.

Witnesses:
JAMES CAHILL,
JOSEPH MEIER.